(12) United States Patent
Garry

(10) Patent No.: US 9,562,474 B2
(45) Date of Patent: Feb. 7, 2017

(54) COMBUSTION CHAMBER HEAT SHIELD AND SEAL ASSEMBLY AND A METHOD OF MANUFACTURING A COMBUSTION CHAMBER HEAT SHIELD AND SEAL ASSEMBLY

(71) Applicant: ROLLS-ROYCE PLC, London (GB)

(72) Inventor: Ian Murray Garry, Thurcaston (GB)

(73) Assignee: ROLLS-ROYCE plc, London (GB)

(*) Notice: Subject to any disclaimer, the term of this patent is extended or adjusted under 35 U.S.C. 154(b) by 391 days.

(21) Appl. No.: 14/173,146

(22) Filed: Feb. 5, 2014

(65) Prior Publication Data

US 2014/0250917 A1   Sep. 11, 2014

(30) Foreign Application Priority Data

Mar. 8, 2013 (GB) .................................. 1304184.3

(51) Int. Cl.

| F02C 7/12 | (2006.01) |
|---|---|
| B22D 25/02 | (2006.01) |
| B22D 5/00 | (2006.01) |
| F23R 3/50 | (2006.01) |
| B22F 5/00 | (2006.01) |
| F02C 7/24 | (2006.01) |

(Continued)

(52) U.S. Cl.
CPC ................ *F02C 7/12* (2013.01); *B22D 25/02* (2013.01); *B22F 3/1055* (2013.01); *B22F 3/225* (2013.01); *B22F 5/00* (2013.01); *B22F 5/009* (2013.01); *F02C 7/24* (2013.01); *F23R 3/10* (2013.01); *F23R 3/50* (2013.01); *F23R 2900/00012* (2013.01); *F23R 2900/00018* (2013.01); *Y02P 10/295* (2015.11)

(58) Field of Classification Search
CPC ................ F02C 7/12; F02C 7/24; F23R 3/10; F23R 3/50; F23R 2900/00018; F23R 2900/00012; B22F 3/1055; B22F 5/009; B22F 3/225; B22F 5/00; B22D 25/02; Y02P 10/295
See application file for complete search history.

(56) References Cited

U.S. PATENT DOCUMENTS 5,354,608 A * 10/1994 Keelan ..................... B22C 1/00
                                                       428/312.2
2005/0178126 A1   8/2005 Young et al.
(Continued)

FOREIGN PATENT DOCUMENTS

| EP | 2 511 613 A2 | 10/2012 |
|---|---|---|
| WO | WO2008/003942 | * 1/2008 |

OTHER PUBLICATIONS

Aug. 6, 2013 Search Report issued in British Patent Application No. GB1304184.3.

*Primary Examiner* — John C Hong
(74) *Attorney, Agent, or Firm* — Oliff PLC

(57) ABSTRACT

A gas turbine engine combustion chamber heat shield and seal assembly comprises a heat shield and a seal. The heat shield has an aperture and the seal is located in the aperture in the heat shield. The seal comprises an annular member having an upstream end, a middle and a downstream end. The upstream end of the seal has a diameter greater than the diameter of the aperture in the heat shield, the middle has a diameter less than the diameter of the aperture in the heat shield and the downstream end of the seal has a diameter greater than the diameter of the aperture in the heat shield.

26 Claims, 5 Drawing Sheets

(51) Int. Cl.
B22F 3/105 (2006.01)
B22F 3/22 (2006.01)
F23R 3/10 (2006.01)

(56) References Cited

U.S. PATENT DOCUMENTS

2008/0236169 A1 10/2008 Hawie et al.
2010/0218787 A1* 9/2010 Ladru .................. B08B 7/0035
 134/2
2012/0073303 A1* 3/2012 McCarren ................ F23M 5/02
 60/752

* cited by examiner

COMBUSTION CHAMBER HEAT SHIELD AND SEAL ASSEMBLY AND A METHOD OF MANUFACTURING A COMBUSTION CHAMBER HEAT SHIELD AND SEAL ASSEMBLY

FIELD OF THE INVENTION

The present invention relates to a combustion chamber heat shield and seal assembly and a method of manufacturing a combustion chamber heat shield and seal assembly and in particular to a gas turbine engine combustion chamber heat shield and seal assembly and a method of manufacturing a gas turbine engine combustion chamber heat shield and seal assembly.

BACKGROUND TO THE INVENTION

A gas turbine engine combustion chamber has an upstream end wall which has one or more apertures and a fuel burner is provided in each of the apertures. The upstream end wall of the combustion chamber is provided with one or more heat shield segments and each heat shield segment is positioned within the combustion chamber and is spaced in a downstream direction from the upstream end wall to shield the upstream end wall from the hot gases in the combustion chamber. Each heat shield segment has an aperture aligned with a corresponding aperture in the upstream end wall and the corresponding fuel burner. A seal assembly is positioned in each aperture in the upstream end wall and the aligned aperture in the respective heat shield segment and around the associated fuel burner. Each seal assembly is mounted within the respective aperture in the upstream end wall to allow relative movement between the fuel burner and the upstream end wall and the heat shield segment. The heat shield segments are mounted onto the upstream end wall using threaded studs on the heat shield segments which extend through apertures in the upstream end wall and washers and nuts are located on the ends of the threaded studs. Alternatively the heat shield segments have bolts which extend through aligned apertures in the heat shield segments and upstream end wall and washers and nuts are located on the ends of the bolts.

Each heat shield and the respective seal assembly are manufactured separately and are assembled into the combustion chamber from the upstream end and the downstream end of the combustion chamber. The heat shield is inserted into the combustion chamber from the downstream end of the combustion chamber whereas the seal assembly is inserted into the combustion chamber from the upstream end of the combustion chamber. Thus, it is difficult to assemble these parts into the combustion chamber and they have to be inserted from opposite sides of the upstream end wall of the combustion chamber.

Therefore the present invention seeks to provide a novel combustion chamber heat shield and seal assembly which reduces or overcomes the above mentioned problem.

STATEMENTS OF INVENTION

Accordingly the present invention provides a combustion chamber heat shield and seal assembly comprising a heat shield and a seal, the heat shield having an aperture and the seal being located in the aperture in the heat shield, the seal comprising an annular member having an upstream end, a middle and a downstream end, the upstream end of the seal having a diameter greater than the diameter of the aperture in the heat shield, the middle having a diameter less than the diameter of the aperture in the heat shield and the downstream end of the seal having a diameter greater than the diameter of the aperture in the heat shield.

The downstream end of the seal may be frusto-conical. The upstream end of the seal may comprise a radially outwardly extending flange. The middle of the seal may have a plurality of apertures extending there-through. The apertures in the middle of the seal may be angled in a downstream direction from an inner surface of the seal to an outer surface of the seal.

The heat shield may have a ring defining the aperture and the ring may have a plurality of apertures extending therethrough. The apertures in the ring may be angled in a downstream direction from an outer surface of the ring to an inner surface of the ring.

The heat shield and the seal may consist of a superalloy. The superalloy may be a nickel base superalloy, a cobalt base superalloy or an iron base superalloy.

The combustion chamber heat shield and seal assembly may be provided in a combustion chamber. The combustion chamber may be a gas turbine engine combustion chamber.

The present invention also provides a method of making a combustion chamber heat shield and seal assembly, the combustion chamber heat shield and seal assembly comprising a heat shield and a seal, the heat shield having an aperture and the seal being located in the aperture in the heat shield, the seal comprising an annular member having an upstream end, a middle and a downstream end, the upstream end of the seal having a diameter greater than the diameter of the aperture in the heat shield, the middle having a diameter less than the diameter of the aperture in the heat shield and the downstream end of the seal having a diameter greater than the diameter of the aperture in the heat shield, the method comprising the steps of:— a) providing a mould, the mould having a first cavity portion having a shape defining the heat shield and a second cavity portion having a shape defining the seal and a third portion interconnecting the first cavity portion and the second cavity portion,
b) casting molten metal into the mould such that the first cavity portion, the second cavity portion and the third portion are filled with molten metal,
c) solidifying the molten metal in the mould to form a metal casting,
d) removing the mould from the metal casting, and
e) separating the first cavity portion from the second cavity portion of the metal casting to produce the combustion chamber heat shield and seal assembly.

The first cavity portion may be separated from the second cavity portion by machining.

The first cavity portion may be separated from the second cavity portion by turning.

The first cavity portion may be separated from the second cavity portion by machining through the third portion.

The upstream end or the downstream end of the seal may be separated from the heat shield by machining. The upstream end or the downstream end of the seal may be separated from the heat shield by turning. The upstream end or the downstream end of the seal and the heat shield may be arranged coaxially in the mould.

The heat shield and the seal may be cast from a superalloy. The superalloy may be a nickel base superalloy, a cobalt base superalloy or an iron base superalloy.

The present invention also provides a method of making a combustion chamber heat shield and seal assembly, the combustion chamber heat shield and seal assembly comprising a heat shield and a seal, the heat shield having an aperture and the seal being located in the aperture in the heat shield, the seal comprising an annular member having an upstream end, a middle and a downstream end, the upstream end of the seal having a diameter greater than the diameter of the aperture in the heat shield, the middle having a diameter less than the diameter of the aperture in the heat shield and the downstream end of the seal having a diameter greater than the diameter of the aperture in the heat shield, the method comprising the steps of:— a) providing a powder bed direct radiation deposition apparatus,
b) directing radiation in a predetermined pattern over metal powder in the powder bed direct radiation deposition apparatus to fuse the metal powder to form the seal and to form the separate heat shield at the same time, and
c) removing the combustion chamber heat shield and the seal from the powder bed direct radiation deposition apparatus.

The powder bed direct radiation deposition apparatus may direct a laser beam, an electron beam or microwave beam onto the metal powder.

The heat shield and the seal may be formed from a superalloy powder. The superalloy powder may be a nickel base superalloy, a cobalt base superalloy or an iron base superalloy.

The present invention also provides a method of making a combustion chamber heat shield and seal assembly, the combustion chamber heat shield and seal assembly comprising a heat shield and a seal, the heat shield having an aperture and the seal being located in the aperture in the heat shield, the seal comprising an annular member having an upstream end, a middle and a downstream end, the upstream end of the seal having a diameter greater than the diameter of the aperture in the heat shield, the middle having a diameter less than the diameter of the aperture in the heat shield and the downstream end of the seal having a diameter greater than the diameter of the aperture in the heat shield, the method comprising the steps of:— a) providing a mould, the mould having a first cavity portion having a shape defining the heat shield and a second cavity portion having a shape defining the seal and a third portion interconnecting the first cavity portion and the second cavity portion,
b) providing a composition comprising a mixture of metal powder and a binder,
c) metal injection moulding the composition into the mould such that the first cavity portion, the second cavity portion and the third portion are filled with the composition,
d) solidifying the composition in the mould to form a green compact,
e) removing the mould from the green compact,
f) removing binder from the green compact to form a brown compact,
g) sintering the brown compact to remove the remainder of the binder and fuse the metal powder together to form a metal injection moulding, and
h) separating the first cavity portion from the second cavity portion of the metal injection moulding to produce the combustion chamber heat shield and seal assembly.

The present invention also provides a method of making a combustion chamber heat shield and seal assembly, the combustion chamber heat shield and seal assembly comprising a heat shield and a seal, the heat shield having an aperture and the seal being located in the aperture in the heat shield, the seal comprising an annular member having an upstream end, a middle and a downstream end, the upstream end of the seal having a diameter greater than the diameter of the aperture in the heat shield, the middle having a diameter less than the diameter of the aperture in the heat shield and the downstream end of the seal having a diameter greater than the diameter of the aperture in the heat shield, the method comprising the steps of:— a) providing a mould, the mould having a first cavity portion having a shape defining the heat shield and a second cavity portion having a shape defining the seal,
b) providing a composition comprising a mixture of metal powder and a binder,
c) metal injection moulding the composition into the mould such that the first cavity portion and the second cavity portion are filled with the composition,
d) solidifying the composition in the mould to form two separate green compacts,
e) removing the mould from the two separate green compacts,
f) removing binder from the green compacts to form two separate brown compacts,
g) sintering the two separate brown compacts to remove the remainder of the binder and fuse the metal powder together in each of the brown compacts to form two metal injection mouldings to produce the combustion chamber heat shield and seal assembly.

The present invention also provides a method of making a combustion chamber heat shield and seal assembly, the combustion chamber heat shield and seal assembly comprising a heat shield and a seal, the heat shield having an aperture and the seal being located in the aperture in the heat shield, the seal comprising an annular member having an upstream end, a middle and a downstream end, the upstream end of the seal having a diameter greater than the diameter of the aperture in the heat shield, the middle having a diameter less than the diameter of the aperture in the heat shield and the downstream end of the seal having a diameter greater than the diameter of the aperture in the heat shield, the method comprising the steps of:— a) providing a mould, the mould having a first cavity portion having a shape defining the heat shield and a second cavity portion having a shape defining the seal,
b) casting molten metal into the mould such that the first cavity portion and the second cavity portion are filled with molten metal,
c) solidifying the molten metal in the mould to form two separate metal castings, and
d) removing the mould from the two separate metal castings to produce the combustion chamber heat shield and seal assembly.

The present invention also provides a method of making a combustion chamber heat shield and seal assembly, the combustion chamber heat shield and seal assembly comprising a heat shield and a seal, the heat shield having an aperture and the seal being located in the aperture in the heat shield, the seal comprising an annular member having an upstream end, a middle and a downstream end, the upstream end of the seal having a diameter greater than the diameter of the aperture in the heat shield, the middle having a diameter less than the diameter of the aperture in the heat shield and the downstream end of the seal having a diameter greater than the diameter of the aperture in the heat shield, the method comprising the steps of:— a) providing a mould, the mould having a first cavity portion having a shape defining the heat shield and a second cavity portion having a shape defining the seal and a third portion interconnecting the first cavity portion and the second cavity portion, b) supplying metal into the mould such that the first cavity portion, the second cavity portion and the third portion are filled with metal,
c) solidifying the metal in the mould,
d) removing the mould from the metal, and
e) separating the first cavity portion from the second cavity portion of the metal casting to produce the combustion chamber heat shield and seal assembly.

Step b) may comprise casting molten metal into the mould such that the first cavity portion, the second cavity portion and the third portion are filled with molten metal, step c) comprises solidifying the molten metal in the mould to form a metal casting, step d) comprises removing the mould from the metal casting, and step e) comprises separating the first cavity portion from the second cavity portion of the metal casting to produce the combustion chamber heat shield and seal assembly.

Alternatively step b) may comprise providing a composition comprising a mixture of metal powder and a binder, metal injection moulding the composition into the mould such that the first cavity portion, the second cavity portion and the third portion are filled with the composition, step c) comprises solidifying the composition in the mould to form a green compact, step d) comprises removing the mould from the green compact, removing binder from the green compact to form a brown compact and sintering the brown compact to remove the remainder of the binder and to fuse the metal powder together to form a metal injection moulding, and step e) comprises separating the first cavity portion from the second cavity portion of the metal injection moulding to produce the combustion chamber heat shield and seal assembly.

The present invention also provides a method of making a combustion chamber heat shield and seal assembly, the combustion chamber heat shield and seal assembly comprising a heat shield and a seal, the heat shield having an aperture and the seal being located in the aperture in the heat shield, the seal comprising an annular member having an upstream end, a middle and a downstream end, the upstream end of the seal having a diameter greater than the diameter of the aperture in the heat shield, the middle having a diameter less than the diameter of the aperture in the heat shield and the downstream end of the seal having a diameter greater than the diameter of the aperture in the heat shield, the method comprising the steps of:—
a) providing a mould, the mould having a first cavity portion having a shape defining the heat shield and a second cavity portion having a shape defining the seal,
b) supplying metal into the mould such that the first cavity portion and the second cavity portion are filled with metal,
c) solidifying the metal in the mould to form two separate metal products, and
d) removing the mould from the two separate metal products to produce the combustion chamber heat shield and seal assembly.

Step b) may comprise casting molten metal into the mould such that the first cavity portion and the second cavity portion are filled with molten metal, step c) comprises solidifying the molten metal in the mould to form two separate metal castings, and step d) comprises removing the mould from the two separate metal castings to produce the combustion chamber heat shield and seal assembly.

Alternatively step b) may comprise providing a composition comprising a mixture of metal powder and a binder, metal injection moulding the composition into the mould such that the first cavity portion and the second cavity portion are filled with the composition, step c) comprises solidifying the composition in the mould to form two separate green compacts, step d) comprises removing the mould from the two separate green compacts, removing binder from the green compacts to form two separate brown compacts, and sintering the two separate brown compacts to remove the remainder of the binder and fuse the metal powder together in each of the brown compacts to form two metal injection mouldings to produce the combustion chamber heat shield and seal assembly.

The binder may be a polymeric binder.

BRIEF DESCRIPTION OF THE DRAWINGS

The present invention will be more fully described by way of example with reference to the accompanying drawings, in which:—

DETAILED DESCRIPTION

Figure 1:
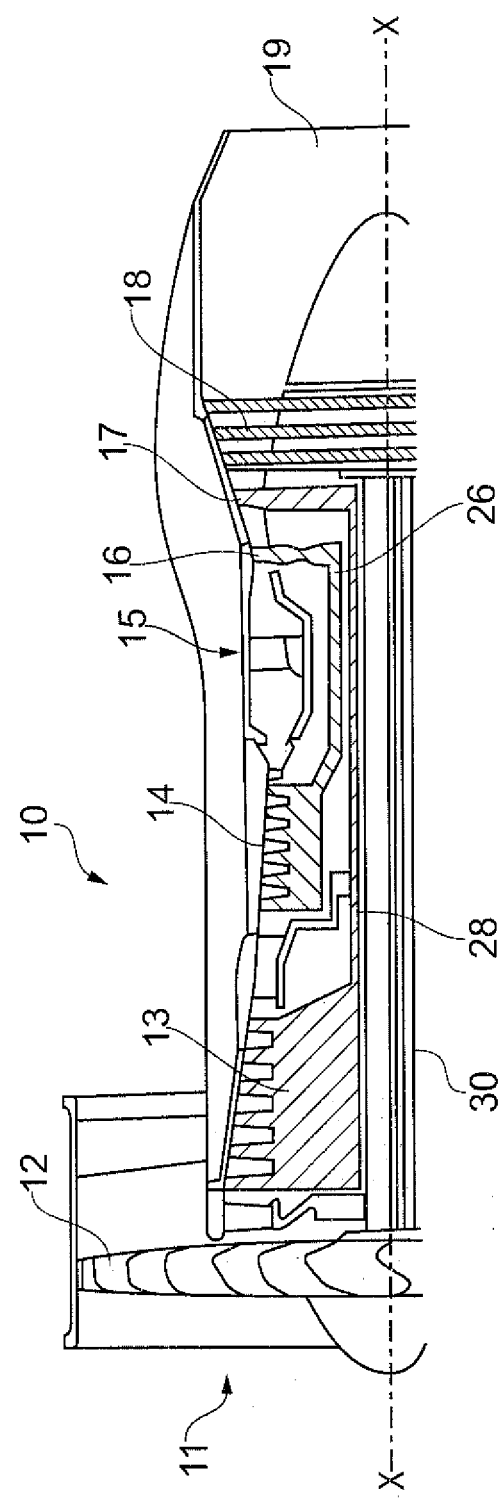
FIG. 1 is partially cut away view of a turbofan gas turbine engine including a combustion chamber having a combustion chamber heat shield and seal assembly according to the present invention.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

Figure 2:
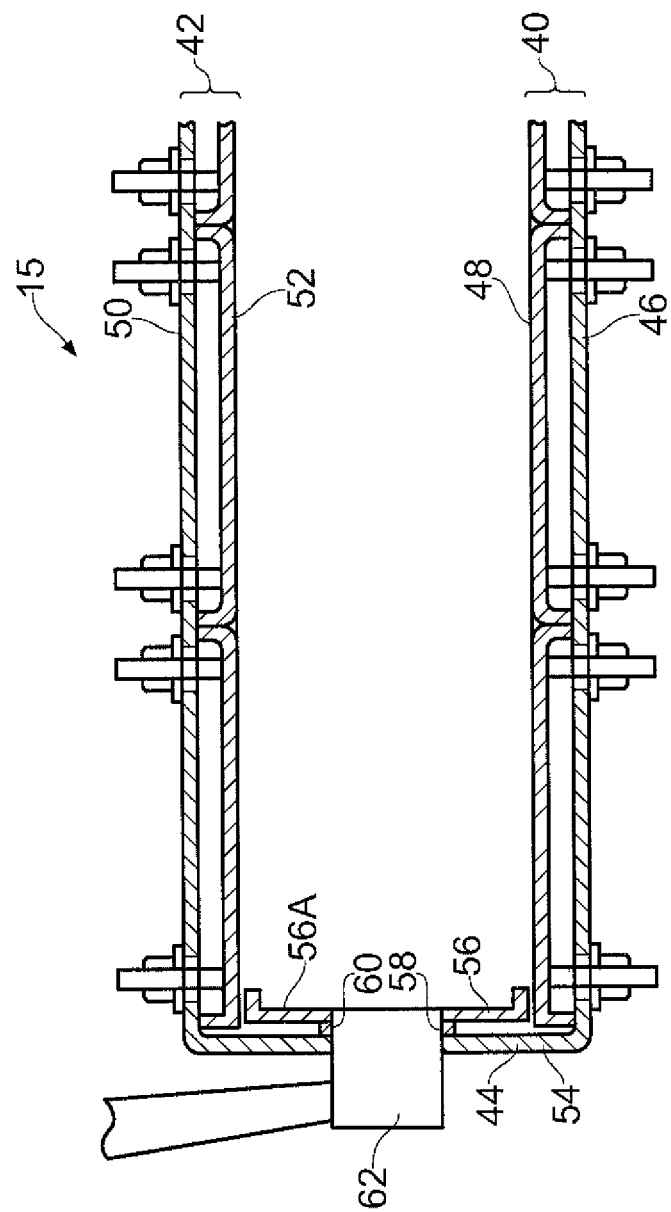
FIG. 2 is an enlarged cross-sectional view of a combustion chamber having a combustion chamber heat shield and seal assembly according to the present invention.

The combustion chamber 15, as shown more clearly in FIG. 2, is an annular combustion chamber and comprises a radially inner annular wall structure 40, a radially outer annular wall structure 42 and an upstream end wall structure 44. The radially inner annular wall structure 40 comprises a first annular wall 46 and a second annular wall 48. The radially outer annular wall structure 42 comprises a third annular wall 50 and a fourth annular wall 52. The second annular wall 48 is spaced radially from and is arranged radially around the first annular wall 46 and the first annular wall 46 supports the second annular wall 48. The fourth annular wall 52 is spaced radially from and is arranged radially within the third annular wall 50 and the third annular wall 50 supports the fourth annular wall 52. The upstream end of the first annular wall 46 is secured to the upstream end wall structure 44 and the upstream end of the third annular wall 50 is secured to the upstream end wall structure 44.

Figure 3:
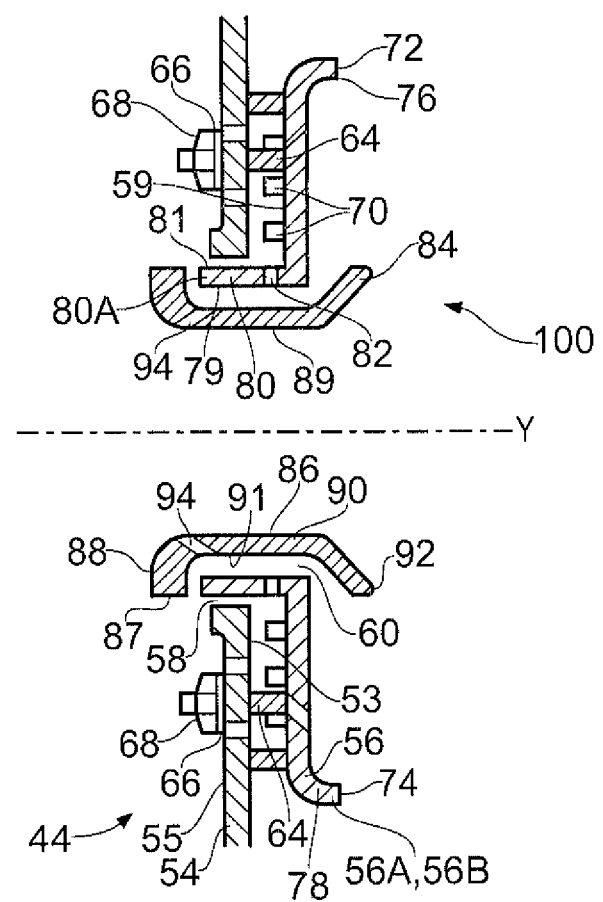
FIG. 3 is an enlarged cross-sectional view of a combustion chamber heat shield and seal assembly according to the present invention.

The upstream end wall structure 44, as shown more clearly in FIG. 3, comprises an upstream end wall 54 and a heat shield 56. The heat shield 56 is spaced axially from and is arranged downstream of the upstream end wall 54 and the upstream end wall 54 supports the heat shield 56. The heat shield 56 comprises a plurality of circumferentially arranged heat shield segments 56A, 56B. The heat shield segments 56A 56B extend through the full circumference of the upstream end wall structure 44 of the combustion chamber 15. The upstream end wall 54 has a plurality of circumferentially spaced apertures 58 and each heat shield segment 56A, 56B has an aperture 60 which is aligned with a corresponding one of the apertures 58 in the upstream end wall 54. Each aperture 58 in the upstream end wall 54 and the aligned aperture 60 in the associated heat shield segment 56A, 56B have a respective one of a plurality of fuel injectors 62 located therein. The fuel injectors 62 are arranged to supply fuel into the annular combustion chamber 15 during operation of the gas turbine engine 10.

Each heat shield segment 56A, 56B has a plurality of threaded studs 64 which extend substantially perpendicularly from the upstream surface 59 of the heat shield segment 56A, 56B in an upstream direction and through corresponding mounting apertures in the upstream end wall 54 and washers 66 and nuts 68 are located on the ends of the threaded studs 64 to secure the heat shield segment 56A, 56B onto the upstream end wall 54. Each washer 66 abuts the upstream surface 55 of the upstream end wall 54 so that the associated threaded stud 64 and nut 68 clamp the heat shield segment 56A, 56B onto the upstream end wall 54. Other suitable types of fastening may be used to secure the heat shield segments 56A, 56B onto the upstream end wall 54.

Each heat shield segment 56A, 56B has a plurality of pins, fins, ribs or other heat transfer features 70 extending from the upstream surface 59 of the heat shield segment 56A, 56B. The pins, fins, ribs or other heat transfer features 70 on the heat shield segments 56A, 56B abut the downstream surface 53 of the upstream end wall 54 to space the heat shield segments 56A, 56B from the upstream end wall 54. The radially outer end 72 and the radially inner end 74 of each heat shield segment 56A, 56B is provided with a flange 76 and 78 respectively which extends in an axially downstream direction. Each heat shield segment 56A, 56B is provided with a ring 80 which defines the aperture 60 in the heat shield segment 56A, 56B. The ring 80 of each heat shield segment 56A, 56B has a plurality of apertures 82 extending there-through and the apertures 82 extend from a radially inner surface 79 of the ring 80 to a radially outer surface 81 of the ring 80. The apertures 82 are arranged equi-circumferentially spaced around the ring 80. The apertures 82 in the ring 80 are angled in a downstream direction from the outer surface 81 of the ring 80 to the inner surface 79 of the ring 80 or the apertures 82 in the ring 80 may extend perpendicularly from the outer surface 81 of the ring 80 to the inner surface 79 of the ring 80. The outer diameter of each ring 80 is less than the diameter of the corresponding aperture 58 in the upstream end wall 54 and the upstream end 80A of each ring 80 extends into the corresponding aperture 58 in the upstream end wall 54.

Each heat shield segment 56A, 56B has a seal 84 located in the aperture 60 in the heat shield segment 56A, 56B and in particular within the ring 80 of the heat shield segment 56A, 56B. Each seal 84 comprises an annular member 86 which has an upstream end 88, a middle 90 and a downstream end 92. The upstream end 88 of each seal 84 has a diameter greater than the diameter of the aperture 60 in the associated heat shield segment 56A, 56B, the middle 90 of each seal 84 has a diameter less than the diameter of the aperture 60 in the associated heat shield segment 56A, 56B and the downstream end 92 of each seal 84 has a diameter greater than the diameter of the aperture 60 in the associated heat shield segment 56A, 56B. The downstream end 92 of each seal 84 is frusto-conical in shape in this example. The upstream end 88 of each seal 84 comprises a radially outwardly extending flange 87 in this example.

The middle 90 of each seal 84 has a plurality of apertures 94 extending there-through. The apertures 94 are arranged equi-circumferentially spaced around the middle 90 of the seal 84. The apertures 94 in the middle 90 of the seal 84 are angled in a downstream direction from an inner surface 89 of the seal 84 to an outer surface 91 of the seal 84 or the apertures 94 in the middle 90 of the seal 84 may extend perpendicularly from the inner surface 89 of the middle 90 of the seal 84 to the outer surface 91 of the middle 90 of the seal 84.

The heat shield segments 56A, 56B and the seal 84 consist of a superalloy, for example the superalloy may be a nickel base superalloy, a cobalt base superalloy or an iron base superalloy. The upstream end wall 54, the first annular wall 46, the second annular wall 48, the third annular wall 50 and the fourth annular wall 52 also consist of a superalloy, for example the superalloy may be a nickel base superalloy, a cobalt base superalloy or an iron base superalloy.

As discussed earlier the fuel injectors 62 are arranged to supply fuel into the annular combustion chamber 15 during operation of the gas turbine engine 10. Each fuel injector 62 locates in a respective aperture 58 in the upstream end wall 54 and the aligned aperture 60 in the associated heat shield segment 56A, 56B. In particular each fuel injector 62 locates in the associated seal 84 positioned in the aperture 60 defined by the ring 80 of the associated heat shield segment 56A, 56B. The internal diameter of the seal 84 is substantially the same as the outer diameter of the fuel injector 62 to form a seal. Each seal 84 is able to float, or move, radially within, and with respect to, the axis Y of the aperture 60 in the associated heat shield segment 56A, 56B to permit relative radial and/or circumferential movement between the fuel injector 62 and the combustion chamber 15 with respect to the axis X of the combustion chamber 15 and gas turbine engine 10. Each seal 84 is also able to float, or move, axially within, and with respect to, the aperture 60 in the associated heat shield segment 56A, 56B.

Thus, it can be seen from FIG. 3 that heat shield segment 56A, 56B and associated seal 84 forms a combustion chamber heat shield and seal assembly 100 and that the combustion chamber 15 has a plurality of circumferentially spaced combustion chamber heat shield and seal assemblies 100. It can be seen that the seal 84 of each combustion chamber heat shield and seal assembly 100 is captured by its associated heat shield segment 56A, 56B because the upstream end 88 of the seal 84 has an outer diameter greater than the diameter of the aperture 60 in the ring 80 of the heat shield segment 56A, 56B and the downstream end 92 of the seal 84 has an outer diameter greater than the diameter of the aperture 60 in the ring 80 of the heat shield segment 56A, 56B.

An advantage of the present invention is that the combustion chamber heat shield and seal assembly comprises a seal which is held captive by the associated heat shield. An advantage of the present invention is that a combustion chamber heat shield and seal assembly is provided which can be inserted and fitted into the combustion chamber from the downstream side of the upstream end wall of the combustion chamber, whereas in the prior art the heat shield is inserted and fitted from the downstream side of the upstream end wall of the combustion chamber and the seal is inserted and fitted from the upstream side of the upstream end wall of the combustion chamber. Thus, the present invention enables the combustion chamber to be assembled and/or repaired more easily by a fitter. A further advantage of the present invention is that there is a significant reduction in the number of parts, a reduction in the weight of the combustion chamber and the associated gas turbine engine, a reduction in the cost and a reduction in the amount of time to assemble/disassemble.

Figure 4:
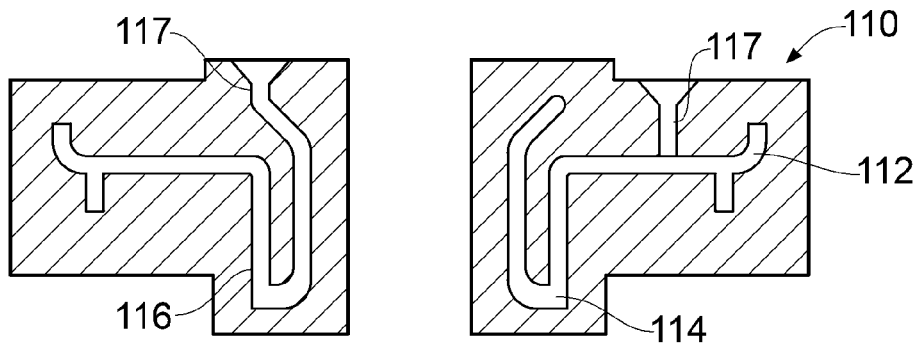
FIG. 4 is a cross-sectional view of a mould for manufacturing a combustion chamber heat shield and seal assembly according to the present invention.
Figure 5:
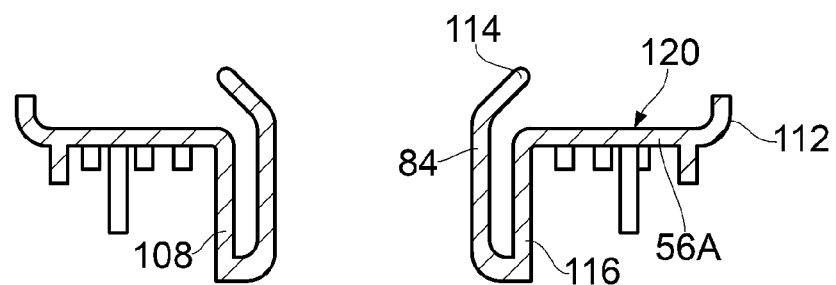
FIG. 5 is a cross-sectional view of a casting produced by the mould shown in FIG. 4.
Figure 6:
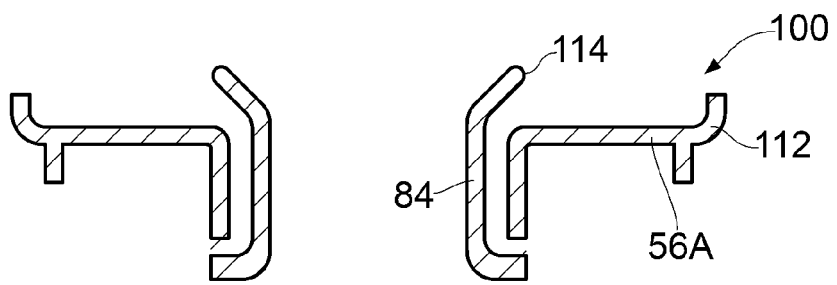
FIG. 6 is a cross-sectional view of the casting shown in FIG. 5 after machining to form a combustion chamber heat shield and seal assembly according to the present invention.

A method of manufacturing the combustion chamber heat shield and seal assembly 100 is illustrated in FIGS. 4 to 6. The combustion chamber heat shield and seal assembly 100 is manufactured by providing a mould 110 as shown in FIG. 4. The mould 110 has a first cavity portion 112 having a shape defining the heat shield 56A, 56B and a second cavity portion 114 having a shape defining the seal 84 and a third cavity portion 116 interconnecting the first cavity portion 112 and the second cavity portion 114. One or more feeder channels 117 extend from the surface of the mould 110 to the first cavity portion 112 and the second cavity portion 114 of the mould 110. Molten metal is poured into the mould 110 through the feeder channel, or channels, 117 such that the first cavity portion 112 and the second cavity portion 114 are filled with molten metal. The molten metal is allowed to solidify in the mould 110 to form a metal casting 120 as shown in FIG. 5 and the metal casting 120 comprises the heat shield segment 56A, 56B, the seal 84 and an interconnecting member 108. Once the metal has solidified in the mould 110 the mould 110 is removed from the metal casting 120 by any suitable technique known to a person skilled in the art. Finally the metal casting 120 is separated, or cut, into two parts by separating what was the first cavity portion 112 of the metal casting 120 from what was the second cavity portion 114 of the metal casting 120 to produce the combustion chamber heat shield and seal assembly 100 as shown in FIG. 6. The mould 110 is produced by the lost wax process in which a wax model of the article to be produced is covered in mould material and the wax model is removed from the mould 110. The mould 110 for example comprises a ceramic material.

In particular the first cavity portion 112 of the metal casting 120 is separated from the second cavity portion 114 of the metal casting 120 by machining and in particular the first cavity portion 112 is separated from the second cavity portion 114 by turning. The first cavity portion 112 of the metal casting 120 is separated from the second cavity portion 114 of the metal casting 120 by machining through what was the third cavity portion 116 of the metal casting 120. The third cavity portion 116 of the mould 110 may be designed to interconnect the upstream end 88 of the seal 84 and the ring 80 of the heat shield segment 56A, 56B and/or to interconnect the downstream end 92 of the seal 84 and the ring 80 of the heat shield segment 56A, 56B. Thus the upstream end 88 or the downstream end 92 of the seal 84 may be separated from the heat shield segment 56A, 56B by machining, e.g. turning. The mould 110 is arranged such that the first cavity portion 112 defining the heat shield segment 56A, 56B and the second cavity portion 114 defining the seal 84 are arranged so that the axes of the ring 80 and the seal 84 are coaxial in the mould 110. The heat shield segment 56A, 56B and the seal 84 are cast from the same superalloy and the superalloy may be a nickel base superalloy, a cobalt base superalloy or an iron base superalloy.

Figure 7:
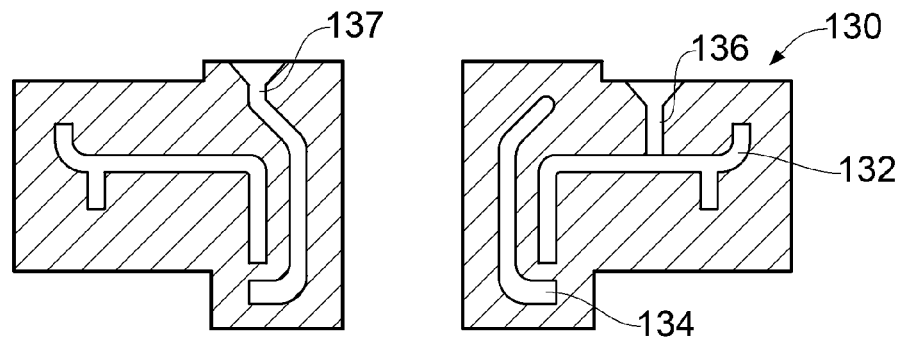
FIG. 7 is a cross-sectional view of a further mould for manufacturing a combustion chamber heat shield and seal assembly according to the present invention.
Figure 8:
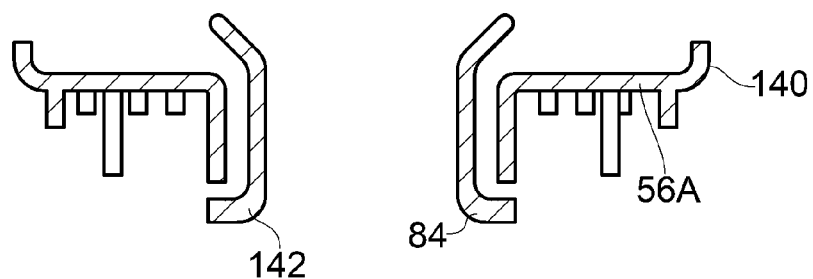
FIG. 8 is a cross-sectional view of the castings produced by the mould shown in FIG. 7.

Another method of manufacturing the combustion chamber heat shield and seal assembly 100 is illustrated in FIGS. 7 and 8. The combustion chamber heat shield and seal assembly 100 is manufactured by providing a mould 130 as shown in FIG. 7. The mould 130 has a first cavity portion 132 having a shape defining the heat shield segment 56A, 56B and a second cavity portion 134 having a shape defining the seal 84. One or more feeder channels 136 extend from the surface of the mould 130 to the first cavity portion 132 of the mould 130 and one or more feeder channels 137 extend from the surface of the mould 130 to the second cavity portion 134 of the mould 130. Molten metal is poured into the mould 130 through the feeder channel 136 such that the first cavity portion 132 is filled with molten metal and molten metal is poured into the mould 130 through the feeder channel 137 such that the second cavity portion 134 is filled with molten metal. The molten metal 138 is allowed to solidify in the mould 130 to form two separate metal castings 140 and 142 as shown in FIG. 8 and the metal casting 140 comprises the heat shield segment 56A, 56B and the metal casting 142 comprises the seal 84. Once the metal has solidified in the mould 130 the mould 130 is removed from the two separate metal castings 140 and 142 by any suitable technique known to a person skilled in the art to produce the combustion chamber heat shield and seal assembly 100 as shown in FIG. 6. The mould 130 is produced by the lost wax process in which wax models of the articles to be produced are covered in mould material and the wax models are removed from the mould 130. The mould 130 for example comprises a ceramic material.

The advantage of this method is that the heat shield segment 56A, 56B and the seal 84 may cast from the same superalloy and the superalloy may be a nickel base superalloy, a cobalt base superalloy or an iron base superalloy or the heat shield segment 56A, 56B and the seal 84 may be cast from two different superalloys and the two different superalloys may be two different nickel base superalloys, two different cobalt base superalloys, two different iron base superalloys or two different metal superalloys, for example one may be a nickel base superalloy and the other may be a cobalt base superalloy.

Figure 9:
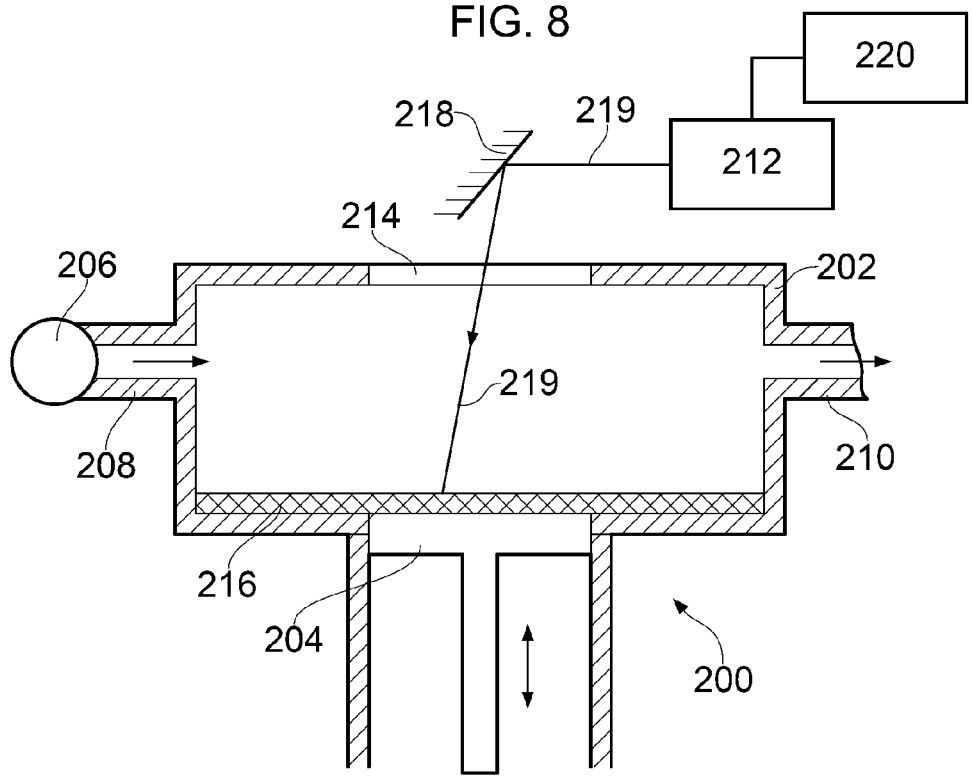
FIG. 9 is an apparatus for manufacturing a combustion chamber heat shield and seal assembly according to the present invention.

A further method of manufacturing the combustion chamber heat shield and seal assembly 100 is illustrated in FIG. 9. The combustion chamber heat shield and seal assembly 100 is manufactured using direct laser deposition or powder bed fusion using an apparatus 200 shown in FIG. 9. Powder bed fusion uses a laser beam or an electron beam to melt and fuse powder particles together to build up an article layer by layer from powder material, e.g. powder metal, by moving the laser beam, or electron beam, in a predetermined pattern, or path, across sequentially deposited layers of powder material.

The apparatus 200 comprises a sealed chamber 202, which has a retractable platform 204. A pump 206 is provided to supply an inert gas, argon or nitrogen, through a pipe 208 into the chamber 202 and gas is extracted from the chamber 202 via a pipe 210. A laser 212, e.g. an infrared laser, is provided to direct a laser beam 219 through a window 214 in the chamber 202. A controller 220 has a CAD definition of the shape and features of the combustion chamber heat shield and seal assembly 100 and the laser 212 is moved under the control of the controller 220.

The combustion chamber heat shield and seal assembly 100 is manufactured by placing a first layer 216 of a suitable metal, or alloy, powder, on the retractable platform 204 in the sealed chamber 202. The laser beam 219 is scanned across the layer of metal powder 216 in a predetermined pattern to form a first layer of the combustion chamber heat shield and seal assembly 100 by bodily moving the laser 212 appropriate distances in perpendicular X and Y directions or by deflecting the laser beam 219 off a movable mirror 218. The laser beam 219 melts and fuses or sinters the metal powder where it strikes the layer of metal powder 216. Then a second, thin, layer of metal, or alloy, is placed on the first layer, the platform 204 is retracted one increment outwards from the chamber 202 and the laser beam 219 is scanned across the layer of metal powder in a further predetermined pattern to form a second layer of the combustion chamber heat shield and seal assembly 100. The laser beam 219 melts and fuses or sinters the metal powder where it strikes the second layer of metal powder 216 and bonds, fuses or sinters the second layer of the combustion chamber heat shield and seal assembly 100 to the first layer of the combustion chamber heat shield and seal assembly 100. The process of placing layers of metal powder, retracting the platform 204 and scanning the laser beam 219 across the layer of metal powder in a predetermined pattern to fuse and sinter the metal powder in each layer and to bond each layer to the previously deposited layer is repeated a sufficient number of times to build the combustion chamber heat shield and seal assembly 100 layer by layer from one axial end to the opposite axial end. The predetermined pattern of scanning of the laser beam 219 for each layer is determined by the CAD model of the combustion chamber heat shield and seal assembly 100. It is necessary to remove the un-fused, or un-sintered, metal powder from the combustion chamber heat shield and seal assembly 100 and this may be by inverting the combustion chamber heat shield and seal assembly 100 to pour out the un-fused metal powder. This removal of the un-fused metal powder may be assisted by vibration, air blast etc. The combustion chamber heat shield and seal assembly 100 is built up layer-by-layer as mentioned previously and in particular the combustion chamber heat shield and seal assembly 100 is built up by depositing the layers of powder metal 216 in planes perpendicular to the axis Y of the combustion chamber heat shield and seal assembly 100 such that the combustion chamber heat shield and seal assembly 100 is built up axially from one axial end to the other axial end, e.g. from its axially upstream end to its axially downstream end. The direct laser deposition process is limited to a maximum over-hang angle of about 30° relative to a horizontal plane and the direct laser deposition process builds up components or articles vertically layer by layer. The laser beam 219 is directed in a predetermined pattern over metal powder 216 in the apparatus 200 to fuse the metal powder 216 to form the seal 84 and to form the separate heat shield segment 56A, 56B at the same time. The completed combustion chamber heat shield and seal assembly 100 is then removed from the apparatus 200. The apparatus 200 may direct a laser beam, an electron beam or a microwave beam onto the metal powder 216. The heat shield and the seal assembly 100 may be formed from a superalloy powder, for example a nickel base superalloy powder, a cobalt base superalloy powder or an iron base superalloy powder.

An additional method of manufacturing the combustion chamber heat shield and seal assembly 100 uses metal injection moulding (MIM), as illustrated with reference to FIGS. 4 to 6. The combustion chamber heat shield and seal assembly 100 is manufactured by providing a mould 110 as shown in FIG. 4. The mould 110 has a first cavity portion 112 having a shape defining the heat shield 56A, 56B and a second cavity portion 114 having a shape defining the seal 84 and a third cavity portion 116 interconnecting the first cavity portion 112 and the second cavity portion 114. One or more feeder channels 117 extend from the surface of the mould 110 to the first cavity portion 112 and the second cavity portion 114 of the mould 110. A composition comprising a mixture of metal powder and a binder, for example polymeric binder, is produced. The composition of metal powder and binder is metal injection moulded into the mould 110 such that the first cavity portion 112, the second cavity portion 114 and the third cavity portion 116 are filled with the composition of metal powder and binder. The composition is solidified in the mould 110 to form a green compact. The mould 110 is removed from the green compact. The binder is removed from the green compact to form a brown compact and the brown compact is sintered at a suitable to remove the remainder of the binder and to fuse the metal powder together to form a metal injection moulding. Finally the first cavity portion 112 is separated from the second cavity portion 114 of the metal injection moulding to produce the combustion chamber heat shield and seal assembly 100. The first cavity portion 112 is separated from the second cavity portion 114 as discussed above by machining, e.g. turning through the third cavity portion 116. The mould 110 in this example may comprise a metallic material for example stainless steel. The mould 130 in this example may comprise a metallic material for example stainless steel. The heat shield segment 56A, 56B and the seal 84 are metal injection moulded from the same superalloy and the superalloy may be a nickel base superalloy, a cobalt base superalloy or an iron base superalloy.

Another method of making a combustion chamber heat shield and seal assembly 100 uses metal injection moulding (MIM), as described with reference to FIGS. 7 and 8. A mould 130 is provided. The mould 130 has a first cavity portion 132 having a shape defining the heat shield segment 56A, 56B and a second cavity portion 134 having a shape defining the seal 84. One or more feeder channels 136 extend from the surface of the mould 130 to the first cavity portion 132 of the mould 130 and one or more feeder channels 137 extend from the surface of the mould 130 to the second cavity portion 134 of the mould 130. A composition comprising a mixture of metal powder and a binder, for example a polymeric binder, is produced. The composition of metal powder and binder is metal injection moulded into the mould 130 such that the first cavity portion 132 and the second cavity portion 134 are filled with the composition of metal powder and binder. The composition is solidified in the mould 130 to form two separate green compacts. The mould 130 is removed from the two separate green compacts. The binder is removed from the two green compacts to form two separate brown compacts and the two separate brown compacts are sintered at a suitable temperature to remove the remainder of the binder and to fuse the metal powder together in each of the brown compacts to form two metal injection mouldings to produce the combustion chamber heat shield and seal assembly 100.

The advantage of this method is that the heat shield segment 56A, 56B and the seal 84 may be metal injection moulded from the same superalloy and the superalloy may be a nickel base superalloy, a cobalt base superalloy or an iron base superalloy or the heat shield segment 56A, 56B and the seal 84 may be metal injection moulded from two different superalloys and the two different superalloys may be two different nickel base superalloys, two different cobalt base superalloys, two different iron base superalloys or two different metal superalloys, for example one may be a nickel base superalloy and the other may be a cobalt base superalloy.

Although the present invention has been described with reference to a combustion chamber heat shield and seal assembly for a gas turbine engine combustion chamber it may equally well be used for other types of combustion chamber.

The invention claimed is:

1. A combustion chamber heat shield and seal assembly comprising a heat shield and a seal,
   the heat shield having an aperture, and
   the seal being located in the aperture in the heat shield,
   the seal comprising an annular member having an upstream end, a middle and a downstream end, the upstream end of the seal having an outer diameter greater than the diameter of the aperture in the heat shield, the middle having a diameter less than the diameter of the aperture in the heat shield and the downstream end of the seal having a diameter greater than the diameter of the aperture in the heat shield.

2. An assembly as claimed in claim 1 wherein the downstream end of the seal is frusto-conical.

3. An assembly as claimed in claim 1 wherein the upstream end of the seal comprises a radially outwardly extending flange.

4. An assembly as claimed in claim 1 wherein the middle of the seal has a plurality of apertures extending there-through.

5. An assembly as claimed in claim 4 wherein the apertures in the middle of the seal are angled in a downstream direction from an inner surface of the seal to an outer surface of the seal.

6. An assembly as claimed in claim 1 wherein the heat shield has a ring defining the aperture and the ring has a plurality of apertures extending there-through.

7. An assembly as claimed in claim 6 wherein the apertures in the ring are angled in a downstream direction from an outer surface of the ring to an inner surface of the ring.

8. An assembly as claimed in claim 1 wherein the heat shield and the seal consist of a superalloy, and the superalloy is selected from the group consisting of a nickel base superalloy, a cobalt base superalloy and an iron base superalloy.

9. A combustion chamber comprising a combustion chamber heat shield and seal assembly as claimed in claim 1, wherein the combustion chamber having an upstream end wall structure,
   the upstream end wall structure comprising an upstream end wall and the heat shield,
   the heat shield being spaced from and being arranged downstream of the upstream end wall, the upstream end wall having an aperture and the aperture in the heat shield being aligned with the aperture in the upstream end wall, and
   a fuel injector being arranged to locate in the seal positioned in the aperture in the heat shield.

10. A method of making a combustion chamber heat shield and seal assembly, the combustion chamber heat shield and seal assembly comprising a heat shield and a seal, the heat shield having an aperture and the seal being located in the aperture in the heat shield, the seal comprising an annular member having an upstream end, a middle and a downstream end, the upstream end of the seal having an outer diameter greater than the diameter of the aperture in the heat shield, the middle having a diameter less than the diameter of the aperture in the heat shield and the downstream end of the seal having a diameter greater than the diameter of the aperture in the heat shield, the method comprising the steps of:
   a) providing a mould, the mould having a first cavity portion having a shape defining the heat shield and a second cavity portion having a shape defining the seal and a third portion interconnecting the first cavity portion and the second cavity portion,
   b) supplying metal into the mould such that the first cavity portion, the second cavity portion and the third portion are filled with metal,
   c) solidifying the metal in the mould,
   d) removing the mould from the metal, and
   e) separating the first cavity portion from the second cavity portion of the metal to produce the combustion chamber heat shield and seal assembly.

11. A method as claimed in claim 10 wherein step b) comprises casting molten metal into the mould such that the first cavity portion, the second cavity portion and the third portion are filled with molten metal, step c) comprises solidifying the molten metal in the mould to form a metal casting, step d) comprises removing the mould from the metal casting, and step e) comprises separating the first cavity portion from the second cavity portion of the metal casting to produce the combustion chamber heat shield and seal assembly.

12. A method as claimed in claim 10 wherein step b) comprises providing a composition comprising a mixture of metal powder and a binder, metal injection moulding the composition into the mould such that the first cavity portion, the second cavity portion and the third portion are filled with the composition, step c) comprises solidifying the composition in the mould to form a green compact, step d) comprises removing the mould from the green compact, removing binder from the green compact to form a brown compact and sintering the brown compact to remove the remainder of the binder and to fuse the metal powder together to form a metal injection moulding, and step e) comprises separating the first cavity portion from the second cavity portion of the metal injection moulding to produce the combustion chamber heat shield and seal assembly.

13. A method as claimed in claim 10 wherein the first cavity portion is separated from the second cavity portion by machining.

14. A method as claimed in claim 13 wherein the first cavity portion is separated from the second cavity portion by turning.

15. A method as claimed in claim 10 wherein the first cavity portion is separated from the second cavity portion by machining through the third portion.

16. A method as claimed in claim 10 wherein the upstream end or the downstream end of the seal is separated from the heat shield by machining.

17. A method as claimed in claim 16 wherein the upstream end or the downstream end of the seal is separated from the heat shield by turning.

18. A method as claimed in claim 10 wherein the upstream end or the downstream end of the seal and the heat shield is arranged coaxially in the mould.

19. A method as claimed in claim 10 wherein the heat shield and the seal are formed from a superalloy, and the superalloy is selected from the group consisting of a nickel base superalloy, a cobalt base superalloy and an iron base superalloy.

20. A method of making a combustion chamber heat shield and seal assembly, the combustion chamber heat shield and seal assembly comprising a heat shield and a seal, the heat shield having an aperture and the seal being located in the aperture in the heat shield, the seal comprising an annular member having an upstream end, a middle and a downstream end, the upstream end of the seal having an outer diameter greater than the diameter of the aperture in the heat shield, the middle having a diameter less than the diameter of the aperture in the heat shield and the downstream end of the seal having a diameter greater than the diameter of the aperture in the heat shield, the method comprising the steps of:
   a) providing a powder bed direct radiation deposition apparatus,
   b) directing radiation in a predetermined pattern over metal powder in the powder bed direct radiation deposition apparatus to fuse the metal powder to form the seal and to form the heat shield at the same time, and
   c) removing the combustion chamber heat shield and the seal assembly from the powder bed direct radiation deposition apparatus.

21. A method as claimed in claim 20 wherein the powder bed direct radiation deposition apparatus directs a laser beam, an electron beam or microwave beam onto the metal powder.

22. A method as claimed in claim 20 wherein the heat shield and the seal are formed from a superalloy powder, and the superalloy powder is selected from the group consisting of a nickel base superalloy, a cobalt base superalloy and an iron base superalloy.

23. A method of making a combustion chamber heat shield and seal assembly, the combustion chamber heat shield and seal assembly comprising a heat shield and a seal, the heat shield having an aperture and the seal being located in the aperture in the heat shield, the seal comprising an annular member having an upstream end, a middle and a downstream end, the upstream end of the seal having an outer diameter greater than the diameter of the aperture in the heat shield, the middle having a diameter less than the diameter of the aperture in the heat shield and the downstream end of the seal having a diameter greater than the diameter of the aperture in the heat shield, the method comprising the steps of:
   a) providing a mould, the mould having a first cavity portion having a shape defining the heat shield and a second cavity portion having a shape defining the seal,
   b) supplying metal into the mould such that the first cavity portion and the second cavity portion are filled with metal,
   c) solidifying the metal in the mould to form two separate metal products, and
   d) removing the mould from the two separate metal products to produce the combustion chamber heat shield and seal assembly.

24. A method as claimed in claim 23 wherein step b) comprises casting molten metal into the mould such that the first cavity portion and the second cavity portion are filled with molten metal, step c) comprises solidifying the molten metal in the mould to form two separate metal castings, and step d) comprises removing the mould from the two separate metal castings to produce the combustion chamber heat shield and seal assembly.

25. A method as claimed in claim 23 wherein step b) comprises providing a composition comprising a mixture of metal powder and a binder, metal injection moulding the composition into the mould such that the first cavity portion and the second cavity portion are filled with the composition, step c) comprises solidifying the composition in the mould to form two separate green compacts, step d) comprises removing the mould from the two separate green compacts, removing binder from the green compacts to form two separate brown compacts, and sintering the two separate brown compacts to remove the remainder of the binder and fuse the metal powder together in each of the brown compacts to form two metal injection mouldings to produce the combustion chamber heat shield and seal assembly.

26. A method as claimed in claim 23 wherein the heat shield and the seal are formed from a superalloy, and the superalloy is selected from the group consisting of a nickel base superalloy, a cobalt base superalloy and an iron base superalloy.

\* \* \* \* \*